(12) United States Patent
Jaffrennou et al.

(10) Patent No.: US 8,623,234 B2
(45) Date of Patent: Jan. 7, 2014

(54) BONDING COMPOSITION FOR MINERAL WOOL BASED ON REDUCING SACCHARIDE AND HYDROGENATED SACCHARIDE, AND INSULATING PRODUCTS OBTAINED

(75) Inventors: Boris Jaffrennou, Paris (FR); Edouard Obert, Coye-la-Foret (FR); Benjamin Kaplan, Paris (FR)

(73) Assignee: Saint-Gobain Isover, Courbevoie (FR)

( * ) Notice: Subject to any disclaimer, the term of this patent is extended or adjusted under 35 U.S.C. 154(b) by 106 days.

(21) Appl. No.: 13/217,094

(22) Filed: Aug. 24, 2011

(65) Prior Publication Data
US 2013/0032749 A1 Feb. 7, 2013

(30) Foreign Application Priority Data

Aug. 5, 2011 (FR) ..................... 11 02476

(51) Int. Cl.
| | | |
|---|---|---|
| C09J 105/00 | (2006.01) | |
| C09J 105/02 | (2006.01) | |
| C08L 5/00 | (2006.01) | |
| C08L 5/02 | (2006.01) | |
| C03C 25/14 | (2006.01) | |
| C03C 25/24 | (2006.01) | |
| D04H 1/58 | (2012.01) | |
| C09J 11/08 | (2006.01) | |
| E04B 1/88 | (2006.01) | |

(52) U.S. Cl.
USPC .... 252/62; 106/135.1; 106/144.1; 106/144.2; 106/144.6; 106/144.7; 106/144.71; 106/144.72; 106/146.1; 106/146.4; 106/146.5; 106/146.51; 106/205.01; 106/205.1; 106/205.2; 106/205.3; 106/205.31; 106/205.6; 106/205.7; 106/205.72; 106/217.5; 106/217.6; 106/217.7; 156/60; 156/62.2; 156/181

(58) Field of Classification Search
USPC ........ 252/62; 106/135.1, 144.1, 144.2, 144.6, 106/144.7, 144.71, 144.72, 146.1, 146.4, 106/146.5, 146.51, 205.01, 205.1, 205.2, 106/205.3, 205.31, 205.6, 205.7, 205.71, 106/205.72, 217.5, 217.6, 217.7; 156/60, 156/62.2, 181

See application file for complete search history.

(56) References Cited

U.S. PATENT DOCUMENTS

| | | |
|---|---|---|
| 5,318,990 A | 6/1994 | Strauss |
| 5,340,868 A | 8/1994 | Strauss et al. |
| 5,661,213 A | 8/1997 | Arkens et al. |
| 5,763,524 A * | 6/1998 | Arkens et al. ................. 524/547 |
| 5,895,804 A | 4/1999 | Lee et al. |
| 5,932,689 A * | 8/1999 | Arkens et al. ................. 528/335 |
| 5,977,232 A | 11/1999 | Arkens et al. |
| 6,071,994 A | 6/2000 | Hummerich et al. |
| 6,099,773 A | 8/2000 | Reck et al. |
| 6,136,916 A * | 10/2000 | Arkens et al. ................. 524/556 |
| 6,146,746 A | 11/2000 | Reck et al. |
| 6,171,654 B1 * | 1/2001 | Salsman et al. ............ 427/389.8 |
| 6,221,973 B1 * | 4/2001 | Arkens et al. ............. 525/327.7 |
| 6,299,936 B1 | 10/2001 | Reck et al. |
| 6,331,350 B1 | 12/2001 | Taylor et al. |
| 2002/0091185 A1 | 7/2002 | Taylor et al. |
| 2002/0188055 A1 | 12/2002 | Chen et al. |
| 2003/0008978 A1 | 1/2003 | Chen et al. |
| 2004/0002567 A1 | 1/2004 | Chen et al. |
| 2005/0215153 A1 | 9/2005 | Cossement et al. |
| 2007/0083004 A1 * | 4/2007 | Shooshtari et al. ........... 524/593 |
| 2007/0270066 A1 * | 11/2007 | Van Herwijnen et al. .... 442/180 |
| 2008/0108741 A1 * | 5/2008 | Van Herwijnen et al. .... 524/443 |
| 2010/0070645 A1 * | 3/2010 | Liu et al. ....................... 709/231 |
| 2010/0282996 A1 * | 11/2010 | Jaffrennou et al. .......... 252/8.83 |
| 2011/0210280 A1 * | 9/2011 | Jaffrennou ...................... 252/62 |

FOREIGN PATENT DOCUMENTS

| | | |
|---|---|---|
| WO | WO 01/96254 | 12/2001 |
| WO | WO 2006/120523 | 11/2006 |
| WO | WO 2008/053332 | 5/2008 |
| WO | WO 2009/080938 | 7/2009 |
| WO | WO 2010/029266 | 3/2010 |
| WO | WO 2010139899 A1 * | 12/2010 |

\* cited by examiner

*Primary Examiner* — Anthony J Green
(74) *Attorney, Agent, or Firm* — Pillsbury Winthrop Shaw Pittman LLP

(57) ABSTRACT

A bonding composition for insulation products based on mineral wool, notably of glass or of rock, includes at least one reducing saccharide, at least one hydrogenated saccharide, and at least one polyfunctional crosslinking agent.

31 Claims, 2 Drawing Sheets

|  | Ex. 1 | Ex. 2 | Ex. 3 | Ex. 4 | Ex. 5 | Ex. 6 | Ref. |
|---|---|---|---|---|---|---|---|
| Composition | | | | | | | |
| Reducing saccharide | | | | | | | |
| Roclys® C3072S[1] | 31 | 50 | 31 | 12 | 31 | 62 | - |
| Hydrogenated saccharide | | | | | | | |
| Maltilite® P200 [2] | 31 | - | - | - | - | - | - |
| Maltilite® 5575 [3] | - | 12 | 31 | 50 | 24 | - | - |
| Citric acid | 38 | 38 | 38 | 38 | 45 | 38 | - |
| Sodium hypophosphite | 5 | 5 | 5 | 5 | 5 | 5 | - |
| Properties | | | | | | | |
| Temperature of the start of crosslinking $T_R$ (°C) | 137 | 121 | 134 | 141 | 125 | 116 | 151 |
| Viscosity (mPa.s) | | | | | | | |
| Dry extract: 10% | 1.2 | 1.3 | 1.2 | 1.2 | 1.1 | 1.3 | 1.0 |
| Dry extract: 30% | 2.9 | 3.1 | 2.9 | 2.8 | 2.5 | 3.1 | 2.4 |
| Dry extract: 50% | 15 | 18 | 17 | 14 | 13 | 19 | 13 |
| Dry extract: 65% | 56 | 78 | 67 | 46 | 51 | 81 | n.d. |
| Dry extract: 70% | 453 | 597 | 521 | 351 | 352 | $1.1 \times 10^3$ | n.d. |
| Dry extract: 75% | $2.2 \times 10^3$ | $3.6 \times 10^3$ | $2.5 \times 10^3$ | $1.6 \times 10^3$ | $1.9 \times 10^3$ | $5.1 \times 10^3$ | n.d. |
| pH[4] | 1.7 | 1.8 | 1.7 | 1.8 | 1.7 | 1.8 | 6.0 |

[1] dextrin derived from maize starch; weight-average molecular weight: 3510; polydispersity index PI: 5.2; dextrose equivalent DE: 30; marketed by ROQUETTE FRERES
[2] crystalline D-maltitol; marketed by TEREOS
[3] maltitol syrup at 75% of dry matter containing 55% of maltitol; marketed by TEREOS
[4] solution at 30% solids

Fig. 2

BONDING COMPOSITION FOR MINERAL WOOL BASED ON REDUCING SACCHARIDE AND HYDROGENATED SACCHARIDE, AND INSULATING PRODUCTS OBTAINED

CROSS-REFERENCE TO RELATED APPLICATIONS

This application claims the benefit of priority from French Patent Application No. 1102476, filed on Aug. 5, 2011, the entire content of which is incorporated herein by reference.

FIELD

The present invention relates to the field of thermal and/or acoustic insulation products, based on mineral wool, notably of glass or of rock, and a formaldehyde-free organic binder. The present invention relates more particularly to a crosslinkable bonding composition for forming said organic binder, which contains a reducing saccharide, a hydrogenated saccharide and a polyfunctional crosslinking agent. The present invention also relates to a method of preparing said bonding composition, and the resultant insulation products.

BACKGROUND

The manufacture of insulation products based on mineral wool generally comprises a step of manufacture of the wool itself, which can be carried out by various methods, for example according to the known technique of fibre production by internal or external centrifugation.

Internal centrifugation consists of introducing the molten mineral material (glass or rock) into a centrifuge comprising a multitude of small orifices, the material being projected towards the peripheral wall of the device under the action of centrifugal force and leaving it in the form of filaments. At the outlet of the centrifuge, the filaments are stretched and entrained towards a receiving device by a high-temperature and high-velocity gas stream, forming a layer of fibres (or mineral wool).

External centrifugation involves pouring the molten material onto the external peripheral surface of rotating parts called rotors, from where the molten material is ejected under the action of centrifugal force. Means are also provided for stretching by a gas stream and for collecting on a receiver.

To ensure that the fibres are gathered together and to provide the layer with cohesion, a bonding composition containing a thermosetting resin is sprayed onto the fibres, on its path from the centrifuge outlet to the receiving device. The layer of fibres coated with the binder is submitted to a thermal treatment, at a temperature generally above 100° C., in order to effect polycondensation of the resin and thus obtain a thermal and/or acoustic insulation product having specific properties, notably dimensional stability, tensile strength, recovery of thickness after compression and uniform colour.

The bonding composition that is to be applied on the mineral wool is generally in the form of an aqueous solution containing the thermosetting resin and additives such as a crosslinking catalyst for the resin, an adhesion-promoting silane, an anti-dust mineral oil, etc. The bonding composition is generally applied on the fibres by spraying.

The properties of the bonding composition largely depend on the characteristics of the resin. From the standpoint of application, the bonding composition must have good sprayability and must be able to be deposited on the surface of the fibres so as to bind them effectively.

The resin must be stable for a given period of time before it is used for forming the bonding composition, said composition generally being prepared at the moment of use by mixing the resin and the additives mentioned above.

In regulatory terms, the resin must be non-polluting, i.e. it should contain—and should generate during the bonding step or subsequently—the minimum possible amount of compounds that can be harmful to human health or to the environment.

The thermosetting resins most commonly used are phenolic resins of the resol class. Besides their good crosslinking capacity in the aforementioned thermal conditions, these resins are water-soluble, possess good affinity for mineral fibres, notably of glass, and are relatively inexpensive.

The commonest resols are obtained by condensation of phenol and formaldehyde, in the presence of a basic catalyst. At the end, these resols contain a certain proportion of unreacted monomers, in particular formaldehyde, whose presence is undesirable on account of its known harmful effects.

For this reason, resol-based resins are generally treated with urea, which reacts with the free formaldehyde, trapping it in the form of non-volatile urea-formaldehyde condensates. Moreover, the presence of urea in the resin gives a certain economic advantage owing to its low cost, as it can be introduced in relatively large amounts without affecting the usage qualities of the resin, notably without adversely affecting the mechanical properties of the finished product, which lowers the total cost of the resin considerably.

It has nevertheless been observed that, in the temperature conditions to which the layer is subjected to obtain crosslinking of the resin, urea-formaldehyde condensates are unstable; they decompose giving formaldehyde and urea again, the latter being degraded at least partially to ammonia, and they are released into the workshop atmosphere.

Regulations on environmental protection have become stricter and they oblige manufacturers of insulation products to find solutions by which the levels of undesirable emissions, especially of formaldehyde, can be reduced even further.

Solutions for replacing resols in the bonding compositions are known and are based on the use of a carboxylic acid and an alcohol.

In U.S. Pat. No. 5,340,868, the binder comprises a polycarboxylic polymer, a β-hydroxylamide and an at least trifunctional monomeric carboxylic acid.

Bonding compositions have also been described comprising an alkanolamine containing at least two hydroxyl groups and a polycarboxylic polymer (U.S. Pat. Nos. 6,071,994, 6,099,773, 6,146,746) which can be combined with a copolymer (U.S. Pat. No. 6,299,936).

Bonding compositions comprising a polycarboxylic polymer and a polyol have also been proposed (US 2002/0091185, US 2002/0091185). These compositions can in addition contain a catalyst, which can be a compound containing phosphorus (U.S. Pat. Nos. 5,318,990, 5,661,213, 6,331,350, US 2003/0008978), a fluoroborate (U.S. Pat. No. 5,977,232) or a cyanamide, a dicyanamide or a cyanoguanidine (U.S. Pat. No. 5,932,689), or a cationic, amphoteric or non-ionic surfactant (US 2002/0188055), or a coupling agent of the silane type (US 2004/0002567).

WO 2006/120523 describes a bonding composition which comprises (a) a poly(vinyl alcohol), (b) a multifunctional crosslinking agent selected from non-polymeric polyacids or salts thereof, anhydrides or a non-polymeric polyaldehyde and (c) optionally a catalyst, the (a)/(b) weight ratio being in the range from 95:5 to 35:65 and the pH being at least equal to 1.25.

From WO 2008/053332, a bonding composition is also known which comprises an adduct of (a) a sugar polymer and (b) a multifunctional crosslinking agent selected from monomeric polyacids or salts thereof, and anhydrides, which is obtained in conditions such that the (a)/(b) weight ratio is in the range from 95:5 to 35:65.

Moreover, bonding compositions have been described in which all or part of the alcohol is replaced with one or more saccharides.

In US 2005/0215153, the bonding composition is formed from a pre-binder containing a polymer of carboxylic acid and of a polyol, and a dextrin as co-binder.

In U.S. Pat. No. 5,895,804, the bonding composition comprises a polycarboxylic polymer with a molecular weight of at least 1000 and a polysaccharide with a molecular weight of at least 10 000.

In WO 2009/080938, the bonding composition comprises at least one organic polycarboxylic acid of molecular weight less than or equal to 1000 and at least one monosaccharide and/or polysaccharide.

Finally, a bonding composition is known from WO 2010/029266 that comprises at least one hydrogenated sugar and a polyfunctional crosslinking agent.

SUMMARY

An aspect of embodiments of the present invention is to improve the known bonding compositions, notably that which is disclosed in WO 2009/080938, and the thermal and/or acoustic insulation products obtained from said composition.

In fact it was found that application of said bonding composition on the mineral fibres by spraying was not satisfactory: very soon after spraying, some of the water contained in the droplets is eliminated, leading to a considerable increase in viscosity of the bonding composition. As a result, the droplets are distributed less effectively on the surface of the mineral fibres and therefore less well at the junction points of the fibres than is required.

To overcome this drawback, an additional amount of water must be added to the bonding composition or separately on the fibres at the moment of spraying. The increase in the amount of water during spraying presents problems in the stove where the blanket of bonded mineral fibres is treated to obtain crosslinking of the binder. To remove the excess water, it is necessary either to increase the temperature in the stove, or increase the residence time of the blanket in the stove by reducing the speed of the production line. Whatever solution is selected, there is an increase in the cost of the finished insulation product.

According to an embodiment of the invention, a proportion of the saccharide in the known bonding composition is replaced with a hydrogenated saccharide, which can lower the viscosity of the bonding composition to a value that is low enough for it to be sprayed correctly on the mineral fibres without having to resort to further addition of water.

Another aspect of embodiments of the invention is to propose a bonding composition that makes it possible to obtain a high binder line efficiency, as will be explained below.

To achieve these aims, an embodiment of the present invention proposes a bonding composition for insulation products based on mineral wool, notably of glass or of rock, which comprises at least one reducing saccharide, at least one hydrogenated saccharide, and at least one polyfunctional crosslinking agent.

BRIEF DESCRIPTION OF THE DRAWINGS

FIG. 2 is a table that summarizes bonding compositions and properties of the bonding compositions according to examples described herein.

DETAILED DESCRIPTION

Figure 1:
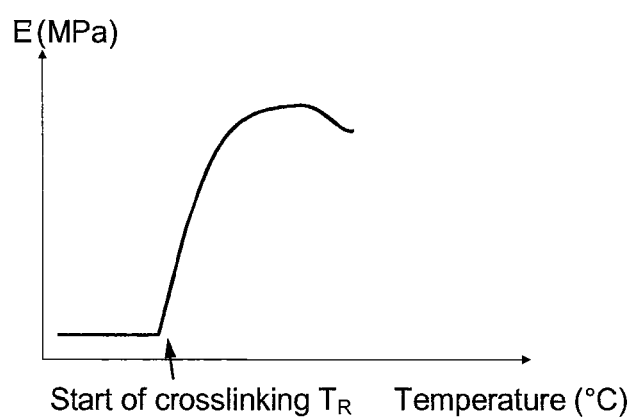
FIG. 1 illustrates the variation of the elastic modulus of a specimen as a function of temperature.

The expression "reducing saccharide" is to be understood in the conventional sense, namely a monosaccharide or a polysaccharide bearing a free hemiacetal OH group, said group notably having a reducing action on cupro-alkaline solutions.

As examples of reducing monosaccharides, we may mention the reducing saccharides containing 3 to 8 carbon atoms, preferably aldoses and advantageously aldoses containing 5 to 7 carbon atoms. Particularly preferred aldoses are the natural aldoses (belonging to the D series), notably hexoses such as glucose, mannose and galactose.

The reducing polysaccharide according to embodiments of the invention is selected from the reducing polysaccharides having a weight-average molecular weight below 1 000 000, preferably below 100 000, more preferably below 50 000, advantageously below 10 000, and better still above 180.

Advantageously, the reducing polysaccharide has a polydispersity index (PI), defined by the ratio of the weight-average molecular weight to the number-average molecular weight, which is less than or equal to 10.

Preferably, the reducing polysaccharide contains at least one unit selected from the aforementioned aldoses, advantageously glucose. Polysaccharides which are constituted predominantly (to more than 50 wt. %) of glucose units are particularly preferred.

According to a preferred embodiment, the invention uses a mixture of reducing monosaccharide(s) and/or polysaccharide(s), notably obtained from plants, in particular a dextrin.

Dextrins are compounds corresponding to the general formula $(C_6H_{10}O_5)_n$ obtained by partial hydrolysis of starch. The methods of preparation of dextrins are known. For example, dextrins can be prepared by heating, or by drying to dryness, a starch, generally in the presence of an acid catalyst, which leads to rupture of the molecules of amylose and of amylopectin of which said starch is constituted, to products of lower molecular weight. Dextrins can also be obtained by treating starch enzymatically with one or more amylases, notably microbial, that are able to hydrolyse the bonds of the starch. The nature of the treatment (chemical or enzymatic) and the hydrolysis conditions have a direct bearing on the average molecular weight and distribution of molecular weights of dextrin.

The dextrins according to the invention can be obtained from starch or from starch derivatives of varying vegetable origin, for example derived from tubers such as potato, manioc, arrowroot and sweet potato, derived from grains such as wheat, maize, rye, rice, barley, millet, oat and sorghum, derived from fruits such as chestnut and hazelnut, or derived from leguminous plants such as pea and bean.

Dextrins are particularly preferred that have a dextrose equivalent DE greater than or equal to 5, preferably greater than or equal to 10, advantageously greater than or equal to 15, and better still less than 100.

Conventionally, the dextrose equivalent DE is defined by the following relation:

$$DE = 100 \times \left( \frac{\text{number of glycoside bonds broken}}{\text{number of glycoside bonds in the initial starch}} \right)$$

"Hydrogenated saccharide" means all the products resulting from reduction, by whatever means, of a saccharide selected from monosaccharides, oligosaccharides, polysaccharides, linear, branched or cyclic, and mixtures of these products, notably starch hydrolysates.

Hydrogenation of the saccharide can be carried out by known methods, working in conditions of high hydrogen pressure and high temperature, in the presence of a catalyst selected from groups IB, IIB, IVB, VI, VII and VIII of the periodic table of the elements, preferably from the group comprising nickel, platinum, palladium, cobalt, molybdenum and mixtures thereof. The preferred catalyst is Raney nickel. Hydrogenation converts the saccharide or the mixture of saccharides (for example a starch hydrolysate) to the corresponding polyols.

Although it is not preferred, hydrogenation can be carried out in the absence of hydrogenation catalyst, in the presence of a source of hydrogen other than hydrogen gas, for example a borohydride of an alkali metal such as sodium borohydride.

As examples of hydrogenated saccharides, we may mention erythritol, arabitol, xylitol, sorbitol, mannitol, iditol, maltitol, isomaltitol, lactitol, cellobitol, palatinitol, maltotritol and the products of hydrogenation of starch hydrolysates, notably marketed by the company Roquette under the designation Polysorb®. Preferably, the products of hydrogenation of starch hydrolysates are used, advantageously a maltitol syrup.

The hydrogenated saccharide according to embodiments of the invention has a number-average molecular weight below 100 000, preferably below 50 000, advantageously below 5000, more particularly below 1000, and better still above 150.

In the bonding composition, the hydrogenated saccharide(s) represent(s) 10 to 90% of the total weight of the reducing saccharide(s) and of the hydrogenated saccharide(s), preferably 18 to 80%, advantageously 30 to 70% and better still 40 to 60%.

As already mentioned, besides lowering the viscosity of the bonding composition, replacement of a proportion of the saccharide with a hydrogenated saccharide has a positive effect on the binder line efficiency in the manufacture of the insulation product based on mineral wool. This efficiency is defined as the ratio of the amount of binder in the finished insulation product to the amount of bonding composition (excluding water) used in manufacturing said product. The binder efficiency is higher, at constant total saccharide content, when the bonding composition contains at least one hydrogenated saccharide. The inventors believe that the increase in efficiency results from the fact that the hydrogenated saccharide cannot be dehydrated, unlike the non-hydrogenated saccharides.

The polyfunctional crosslinking agent is able to react with the hydroxyl groups of the reducing saccharide and of the hydrogenated saccharide under the action of heat to form ester bonds, leading to formation of a polymer network in the final binder. This polymer network means that bonds can be established at the junction points of the fibres in the mineral wool.

The polyfunctional crosslinking agent is selected from organic polycarboxylic acids or salts of these acids, anhydrides and polyaldehydes.

"Organic polycarboxylic acid" means an organic acid comprising at least two carboxyl functions, preferably at most 300, and advantageously at most 70, and better still at most 15 carboxyl functions.

The organic polycarboxylic acid can be a non-polymeric or polymeric acid; it has a number-average molecular weight generally less than or equal to 50 000, preferably less than or equal to 10 000 and advantageously less than or equal to 5000.

The non-polymeric organic polycarboxylic acid is a linear or branched, saturated or unsaturated alicyclic acid, a cyclic acid or an aromatic acid.

The non-polymeric organic polycarboxylic acid can be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and derivatives thereof, notably containing at least one boron or chlorine atom, tetrahydrophthalic acid and derivatives thereof, notably containing at least one chlorine atom such as chlorendic acid, isophthalic acid, terephthalic acid, mesaconic acid and citraconic acid; a tricarboxylic acid, for example citric acid, tricarballylic acid, 1,2,4-butanetricarboxylic acid, aconitic acid, hemimellitic acid, trimellitic acid and trimesic acid; a tetracarboxylic acid, for example 1,2,3,4-butanetetracarboxylic acid and pyromellitic acid.

Particularly advantageously, the non-polymeric organic polycarboxylic acid contains two to four carboxyl functions.

As examples of polymeric organic polycarboxylic acid, we may mention the homopolymers of unsaturated carboxylic acid such as (meth)acrylic acid, crotonic acid, isocrotonic acid, maleic acid, cinnamic acid, 2-methylmaleic acid, fumaric acid, itaconic acid, 2-methylitaconic acid, $\alpha,\beta$-methyleneglutaric acid and monoesters of unsaturated dicarboxylic acid, such as $C_1$-$C_{10}$ alkyl maleates and fumarates, and copolymers of at least one unsaturated carboxylic acid mentioned above and at least one vinylic monomer such as styrene, either unsubstituted, or substituted with alkyl, hydroxyalkyl or sulphonyl groups, or with a halogen atom, (meth)acrylonitrile, (meth)acrylamide, either unsubstituted, or substituted with $C_1$-$C_{10}$ alkyl groups, alkyl(meth)acrylates, notably methyl(meth)acrylate, ethyl(meth)acrylate, n-butyl(meth)acrylate and isobutyl(meth)acrylate, glycidyl (meth)acrylate, butadiene and a vinylic ester, notably vinyl acetate.

Preferably, the bonding composition comprises at least one non-polymeric organic polycarboxylic acid having a number-average molecular weight less than or equal to 1000, preferably less than or equal to 750 and advantageously less than or equal to 500, optionally mixed with at least one polymeric organic acid.

The polyfunctional crosslinking agent can also be an anhydride, notably maleic anhydride, succinic anhydride or phthalic anhydride. However, addition of an anhydride to the bonding composition causes a sharp drop in pH, which leads to problems of corrosion of the equipment in the line for manufacture and hydrolysis of the hydrogenated saccharide. By adding a base, the pH of the bonding composition can be increased sufficiently to avoid these problems. The cost associated with the extra addition of the base means that the use of anhydride is not preferred.

The polyfunctional crosslinking agent can also be a polyaldehyde.

"Polyaldehyde" means an aldehyde comprising at least two aldehyde functions.

Preferably, the polyaldehyde is a non-polymeric dialdehyde, for example glyoxal, glutaraldehyde, 1,6-hexanedial or 1,4-terephthalic dialdehyde.

The polyaldehydes have very high reactivity with respect to the hydroxyl groups of the reducing saccharide and of the hydrogenated saccharide but also hydroxyl groups in general, which can present problems, notably a decrease in stability and/or pre-gelation of the bonding composition before the thermal crosslinking treatment. To prevent these problems, the aldehyde functions of the polyaldehyde are advantageously blocked to prevent reaction with the constituents present in the bonding composition before the mineral wool enters the stove. As examples of agents for blocking the aldehyde functions, we may mention urea and cyclic ureas.

Among the aforementioned polyfunctional crosslinking agents, organic polycarboxylic acids are preferred.

In the bonding composition, the reducing saccharide(s) and the hydrogenated saccharide(s) represent(s) 10 to 90% of the weight of the mixture consisting of the reducing saccharide(s), the hydrogenated saccharide(s) and the polyfunctional crosslinking agent, preferably 20 to 85%, and advantageously 30 to 80%.

The bonding composition can further comprise an acid catalyst or basic catalyst, which notably has the function of adjusting the temperature of the start of crosslinking.

The catalyst can be selected from Lewis bases and acids, such as clays, silica or colloidal silica, organic amines, quaternary amines, metal oxides, metal sulphates, metal chlorides, urea sulphates, urea chlorides and silicate-based catalysts.

The catalyst can also be a compound containing phosphorus, for example a hypophosphite salt of alkali metal, an alkali metal phosphite, an alkali metal polyphosphate, an alkali metal hydrogen phosphate, a phosphoric acid or an alkylphosphonic acid. Preferably, the alkali metal is sodium or potassium.

The catalyst can also be a compound containing fluorine and boron, for example tetrafluoroboric acid or a salt of this acid, notably a tetrafluoroborate of an alkali metal such as sodium or potassium, a tetrafluoroborate of an alkaline-earth metal such as calcium or magnesium, a tetrafluoroborate of zinc and a tetrafluoroborate of ammonium.

Preferably, the catalyst is sodium hypophosphite, sodium phosphite and mixtures of these compounds.

The amount of catalyst added to the bonding composition can represent up to 20% of the total weight of the reducing saccharide(s), of the hydrogenated saccharide(s) and of the polyfunctional crosslinking agent, preferably up to 10%, and advantageously it is at least equal to 1%.

The bonding composition according to the invention can further comprise the following conventional additives in the following proportions calculated on the basis of 100 parts by weight of reducing saccharide(s), of hydrogenated saccharide(s) and of polyfunctional crosslinking agent: 0 to 2 parts of silane, in particular an aminosilane, 0 to 20 parts of oil, preferably 4 to 15 parts, 0 to 30 parts of urea, preferably 0 to 20 parts, 0 to 5 parts of a silicone, 0 to 20 parts of a polyol different from the aforementioned saccharides, 0 to 30 parts of an "extender" selected from the derivatives of lignin such as ammonium lignosulphonate (ALS) or sodium lignosulphonate, and animal or vegetable proteins.

The role of the additives is known and will briefly be recalled: silane is a coupling agent between the fibres and the binder, and also plays a role as anti-ageing agent; the oils are anti-dust and hydrophobic agents; urea and glycerol perform the role of plasticizers and can prevent pre-gelation of the bonding composition; silicone is a hydrophobic agent, with the function of reducing absorption of water by the insulation product; "extender" is an organic filler that is soluble or dispersible in the aqueous bonding composition and notably makes it possible to reduce the cost of the bonding composition.

The polyol added as additive is necessarily different from the reducing saccharide and the hydrogenated saccharide. This polyol can notably be glycerol, a glycol such as ethylene glycol, propylene glycol, butylene glycol and poly(alkylene) glycols based on these glycols, or homopolymers and copolymers of vinyl alcohol.

When the polyfunctional crosslinking agent is an organic polycarboxylic acid, the bonding composition has an acid pH, of the order of 1 to 5 depending on the type of acid used, preferably greater than or equal to 1.0. Advantageously, the pH is maintained at a value at least equal to 1.5 so as to limit problems of instability of the bonding composition and corrosion of the production line, through addition of an amine compound that is unable to react with the reducing saccharide and the hydrogenated saccharide, for example a tertiary amine, notably triethanolamine. The amount of amine compound can represent up to 30 parts by weight of the total weight of the reducing saccharide(s) and hydrogenated saccharide(s) and of the organic polycarboxylic acid.

The bonding composition is intended to be applied on mineral fibres, notably fibres of glass or of rock.

Conventionally, the bonding composition is projected onto the mineral fibres at the centrifuge outlet and before they are collected on the receiving device in the form of a layer of fibres, which is then treated at a temperature permitting crosslinking of the bonding composition and formation of an infusible binder. The crosslinking of the bonding composition according to the invention is effected at a temperature comparable to that of a conventional phenol formaldehyde resin, at a temperature greater than or equal to 110° C., preferably greater than or equal to 130° C., and advantageously greater than or equal to 140° C.

The acoustic and/or thermal insulation products obtained from these bonded fibres also constitute an object of the present invention.

These products are generally in the form of a blanket or of a felt of mineral wool, of glass or of rock, or of a mat of mineral fibres, also of glass or of rock, notably intended to form a surface covering of said blanket or of said felt.

The following examples illustrate the invention but without limiting it.

In these examples:
the temperature of the start of crosslinking ($T_R$) is measured by Dynamic Mechanical Analysis (DMA), which characterizes the viscoelastic behaviour of a polymer material. The procedure is as follows: a specimen of Whatman paper is impregnated with the bonding composition (organic solids content of the order of 40%) and is then fixed horizontally between two jaws. An oscillating element equipped with a device for measuring the stress as a function of the applied deformation is arranged on the upper face of the specimen. The device makes it possible to calculate the elastic modulus E'. The specimen is heated to a temperature varying from 20 to 250° C. at a rate of 4° C./min. The measurements are used for plotting the curve of the variation of the elastic modulus E' (in MPa) as a function of temperature (in ° C.), the general form of which is shown in FIG. 1. The values corresponding to the temperature of the start of crosslinking ($T_R$) in ° C. are determined from the curve.

the viscosity, expressed in mPa·s, is measured using a rheometer of the plate-plate rotary type with shearing of $100\ s^{-1}$, at 20° C.

EXAMPLES 1 TO 6

Bonding compositions are prepared comprising the constituents given in the table of FIG. 2, expressed in parts by weight.

The bonding compositions are prepared by adding successively, to a vessel containing water, the reducing saccharide, the hydrogenated saccharide, citric acid and sodium hypophosphite (catalyst), stirring vigorously until the constituents have dissolved completely.

The properties of the bonding compositions given in the table of FIG. 2 are evaluated in comparison with a conventional bonding composition containing a phenol formaldehyde resin and urea (Reference) prepared according to example 2, test 1 of WO 01/96254 A1 and with a composition not containing hydrogenated saccharide (comparative example 6).

The bonding compositions of examples 1 to 5 have a temperature of the start of crosslinking ($T_R$) that is comparable to that of comparative example 6 and of the Reference.

The pH of the bonding compositions according to the invention is similar to that of comparative example 6.

The viscosities of examples 1 to 5 are, regardless of the dry extract, lower than that of comparative example 6. Notably, the compositions of example 4 with 70 and 75% of dry extract have a viscosity that is about 3 times lower.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

What is claimed is:

1. A bonding composition for insulation products based on mineral wool, the bonding composition comprising:
   at least one reducing saccharide,
   at least one hydrogenated saccharide selected from the group consisting of erythritol, arabitol, xylitol, sorbitol, mannitol, iditol, maltitol, isomaltitol, lactitol, cellobitol, palatinitol, maltotritol and a hydrogenation product of starch hydrolysate,
   at least one polyfunctional crosslinking agent selected from the group consisting of an organic polycarboxylic acid or a salt thereof, a anhydride and a polyaldehyde, and
   a polyol different from the at least one reducing saccharide and the at least one hydrogenated saccharide, said polyol being in a proportion which varies from 0 to 20 parts calculated on the basis of 100 parts by total weight of the mixture consisting of the at least one reducing saccharide, the at least one hydrogenated saccharide and the at least one polyfunctional crosslinking agent,
   wherein the at least one reducing saccharide and the at least one hydrogenated saccharide represent 40 to 90% of the total weight of the mixture consisting of the at least one reducing saccharide, the at least one hydrogenated saccharide and the at least one polyfunctional crosslinking agent.

2. The bonding composition according to claim 1, wherein the mineral wool is based on rock or of glass.

3. An acoustic and/or thermal insulation product based on mineral wool bonded by means of a bonding composition comprising:
   at least one reducing saccharide,
   at least one hydrogenated saccharide selected from the group consisting of erythritol, arabitol, xylitol, sorbitol, mannitol, iditol, maltitol, isomaltitol, lactitol, cellobitol, palatinitol, maltotritol and a hydrogenation product of starch hydrolysate,
   at least one polyfunctional crosslinking agent selected from the group consisting of an organic polycarboxylic acid or a salt thereof, a anhydride and a polyaldehyde, and
   a polyol different from the at least one reducing saccharide and the at least one hydrogenated saccharide, said polyol being in a proportion which varies from 0 to 20 parts calculated on the basis of 100 parts by total weight of the mixture consisting of the at least one reducing saccharide, the at least one hydrogenated saccharide and the at least one polyfunctional crosslinking agent,
   wherein the at least one reducing saccharide and the at least one hydrogenated saccharide represent 40 to 90% of the total weight of the mixture consisting of the at least one reducing saccharide, the at least one hydrogenated saccharide and the at least one polyfunctional crosslinking agent.

4. The product according to claim 3, wherein the reducing saccharide is selected from reducing monosaccharides containing 3 to 8 carbon atoms.

5. The product according to claim 4, wherein the reducing monosaccharide is an aldose.

6. The product according to claim 5, wherein the aldose is a hexose.

7. The product according to claim 3, wherein the reducing saccharide is a reducing polysaccharide having a weight-average molecular weight below 1 000 000.

8. The product according to claim 7, wherein the reducing polysaccharide is constituted of glucose units to more than 50%.

9. The product according to claim 3, wherein the reducing saccharide is a mixture of reducing monosaccharides or a mixture of reducing polysaccharides or a mixture of a reducing monosaccharide and a reducing polysaccharide.

10. The product according to claim 3, wherein the hydrogenated saccharide is a product of hydrogenation of a starch hydrolysate.

11. The product according to claim 3, wherein the hydrogenated saccharide has a number-average molecular weight below 100 000.

12. The product according to claim 3, wherein the at least one hydrogenated saccharide represent(s) 10 to 90% of the total weight of the least one reducing saccharide and of the at least one hydrogenated saccharide.

13. The product according to claim 3, wherein the organic polycarboxylic acid comprises at least two carboxyl functions, and at most 300 carboxyl functions.

14. The product according to claim 13, wherein the organic polycarboxylic acid is a non-polymeric or polymeric acid and has a number-average molecular weight less than or equal to 50 000.

15. The product according to claim 13, wherein the organic polycarboxylic acid is non-polymeric and contains two to four carboxyl functions.

16. The product according to claim 3, wherein the anhydride is maleic anhydride, succinic anhydride or phthalic anhydride.

17. The product according to claim 3, wherein the polyaldehyde is a non-polymeric dialdehyde.

18. The product according to claim 3, wherein the composition further comprises a catalyst selected from the group consisting of Lewis acids and bases, compounds containing phosphorus and compounds containing fluorine and boron.

19. The product according to claim 18, wherein the catalyst represents up to 20% of the total weight of the at least one reducing saccharide, of the at least one hydrogenated saccharide and of the at least one polyfunctional crosslinking agent.

20. The product according to claim 3, wherein the composition further comprises the following additives in the following proportions calculated on the basis of 100 parts by total weight of the at least one reducing saccharide, of the at least one hydrogenated saccharide and of the at least one polyfunctional crosslinking agent:
0 to 2 parts of silane,
0 to 20 parts of oil,
0 to 30 parts of urea,
0 to 5 parts of a silicone,
0 to 30 parts of an extender selected from derivatives of lignin, and animal or vegetable proteins.

21. The product according to claim 3, wherein the mineral wool is based on rock or of glass.

22. The product according to claim 6, wherein the hexose is glucose, mannose or galactose.

23. The product according to claim 9, wherein the reducing saccharide is a dextrin.

24. The product according to claim 23, wherein the dextrin has a dextrose equivalent greater than or equal to 5.

25. The product according to claim 10, wherein the product of hydrogenation of the starch hydrolysate is a maltitol syrup.

26. The product according to claim 17, wherein the non-polymeric dialdehyde is glyoxal, glutaraldehyde, 1,6-hexanedial or 1,4-terephthalic dialdehyde.

27. The product according to claim 20, wherein the derivatives of lignin include ammonium lignosulphonate or sodium lignosulphonate.

28. A mat of mineral fibres bonded by means of the bonding composition comprising:
at least one reducing saccharide,
at least one hydrogenated saccharide selected from the group consisting of erythritol, arabitol, xylitol, sorbitol, mannitol, iditol, maltitol, isomaltitol, lactitol, cellobitol, palatinitol, maltotritol and a hydrogenation product of starch hydrolysate,
at least one polyfunctional crosslinking agent selected from the group consisting of an organic polycarboxylic acid or a salt thereof, a anhydride and a polyaldehyde, and
a polyol different from the at least one reducing saccharide and the at least one hydrogenated saccharide, said polyol being in a proportion which varies from 0 to 20 parts calculated on the basis of 100 parts by total weight of the mixture consisting of the at least one reducing saccharide, the at least one hydrogenated saccharide and the at least one polyfunctional crosslinking agent,
wherein the at least one reducing saccharide and the at least one hydrogenated saccharide represent 40 to 90% of the total weight of the mixture consisting of the at least one reducing saccharide, the at least one hydrogenated saccharide and the at least one polyfunctional crosslinking agent.

29. The mat according to claim 28, wherein the mineral wool is based on rock or of glass.

30. A method of manufacturing an acoustic and/or thermal insulation product based on mineral wool or of a mat of mineral fibres, the method comprising:
projecting a bonding composition onto said wool or said fibres; and
treating said wool or said fibres at a temperature permitting crosslinking of the bonding composition and formation of an infusible binder, wherein the bonding composition comprises
at least one reducing saccharide,
at least one hydrogenated saccharide selected from the group consisting of erythritol, arabitol, xylitol, sorbitol, mannitol, iditol, maltitol, isomaltitol, lactitol, palatinitol, maltotritol and a hydrogenation product of starch hydrolysate,
at least one polyfunctional crosslinking agent selected from the group consisting of an organic polycarboxylic acid or a salt thereof, a anhydrides and a polyaldehyde, and
a polyol different from the at least one reducing saccharide and the at least one hydrogenated saccharide, said polyol being in a proportion which varies from 0 to 20 parts calculated on the basis of 100 parts by total weight of the mixture consisting of the at least one reducing saccharide, the at least one hydrogenated saccharide and the at least one polyfunctional crosslinking agent,
wherein the at least one reducing saccharide and the at least one hydrogenated saccharide represent 40 to 90% of the total weight of the mixture consisting of the at least one reducing saccharide, the at least one hydrogenated saccharide and the at least one polyfunctional crosslinking agent.

31. An acoustic and/or thermal insulation product based on mineral wool bonded by means of a bonding composition consisting essentially of:
at least one reducing saccharide,
at least one hydrogenated saccharide selected from the group consisting of erythritol, arabitol, xylitol, sorbitol, mannitol, iditol, maltitol, isomaltitol, lactitol, cellobitol, palatinitol, maltotritol and a hydrogenation product of starch hydrolysate,
at least one polyfunctional crosslinking agent selected from the group consisting of an organic polycarboxylic acid or a salt thereof, a anhydride and a polyaldehyde, and
at least one optional additive selected from the group consisting of silane, oil, urea, silicone and an extender selected from derivatives of lignin, and animal or vegetable proteins, the at least one optional additive in the following proportion calculated on the basis of 100 parts by total weight of the mixture consisting of the at least one reducing saccharide, the at least one hydrogenated saccharide and the at least one polyfunctional crosslinking agent:
0 to 2 parts of silane,
0 to 20 parts of oil,
0 to 30 parts of urea,
0 to 5 parts of a silicone,
0 to 30 parts of extender,
wherein the at least one reducing saccharide and the at least one hydrogenated saccharide represent 10 to 90% of the total weight of the mixture consisting of the at least one reducing saccharide, the at least one hydrogenated saccharide and the at least one polyfunctional crosslinking agent.

* * * * *

UNITED STATES PATENT AND TRADEMARK OFFICE
CERTIFICATE OF CORRECTION

PATENT NO. : 8,623,234 B2  
APPLICATION NO. : 13/217094  
DATED : January 7, 2014  
INVENTOR(S) : Boris Jaffrennou et al.

Page 1 of 1

It is certified that error appears in the above-identified patent and that said Letters Patent is hereby corrected as shown below:

In the Claims

Column 12, lines 8-10, Claim 31
        replace "mannitol, iditol, maltitol, isomaltitol, lactitol, palatinitol, maltotritol and a hydrogenation product of starch hydrolysate,"
        with -- mannitol, iditol, maltitol, isomaltitol, lactitol, cellobitol, palatinitol, maltotritol and a hydrogenation product of starch hydrolysate, --

Signed and Sealed this  
First Day of April, 2014

Michelle K. Lee  
*Deputy Director of the United States Patent and Trademark Office*